United States Patent
Navok et al.

(10) Patent No.: US 9,571,542 B2
(45) Date of Patent: Feb. 14, 2017

(54) CONTENT PROVIDING SYSTEM, DEVICE, AND CONTROL METHOD FOR PROVIDING DIFFERENT INCREMENTS BASED ON SELECTED ADVERTISEMENT

(71) Applicant: SQUARE ENIX HOLDINGS CO., LTD., Tokyo (JP)

(72) Inventors: Jacob Dan Navok, Tokyo (JP); Martin Jensen, Copenhagen K (DK); Mads Wibroe, Copenhagen K (DK)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 213 days.

(21) Appl. No.: 14/084,929

(22) Filed: Nov. 20, 2013

(65) Prior Publication Data

US 2014/0188983 A1    Jul. 3, 2014

(30) Foreign Application Priority Data

Dec. 28, 2012 (JP) ................................ 2012-288489

(51) Int. Cl.
*H04L 29/06* (2006.01)
*H04L 29/08* (2006.01)

(52) U.S. Cl.
CPC ....... *H04L 65/4084* (2013.01); *H04L 65/4076* (2013.01); *H04L 65/604* (2013.01); *H04L 67/20* (2013.01)

(58) Field of Classification Search
None
See application file for complete search history.

(56) References Cited

U.S. PATENT DOCUMENTS

| 8,190,762 B2 | 5/2012 | Masunaga et al. |
| 8,307,392 B2 * | 11/2012 | Ahanger ............... G06Q 30/02 725/32 |
| 8,527,337 B1 * | 9/2013 | Lim ....................... G06Q 30/00 434/354 |

(Continued)

FOREIGN PATENT DOCUMENTS

| JP | 2002-183616 | 6/2002 |
| JP | 2004-056535 | 2/2004 |

(Continued)

OTHER PUBLICATIONS

Office Action from Japan Patent Office (JPO) in Japanese Patent Application No. 2012-288489, dated Jan. 16, 2015, along with an English language translation thereof.

(Continued)

*Primary Examiner* — Shirley Zhang
(74) *Attorney, Agent, or Firm* — Greenblum & Bernstein, P.L.C.

(57) ABSTRACT

In a content providing system, in a case where the display of an advertisement is instructed during the playback of content data, a client device pauses the playback of content data and plays back the advertisement data. A content providing device, after the advertisement data is played, increases the amount of time for which the content data can be played by an amount predefined for the advertisement Also, the content providing device, after transmitting the advertisement data, transmits content data corresponding to the amount of time for which content data can be played.

10 Claims, 6 Drawing Sheets

(56) References Cited

U.S. PATENT DOCUMENTS

| | | | |
|---|---|---|---|
| 8,635,526 B2 | 1/2014 | Wang et al. | |
| 8,677,391 B2 | 3/2014 | Tanaka et al. | |
| 8,712,902 B2* | 4/2014 | Jobs | G06Q 30/02 705/37 |
| 8,719,855 B2* | 5/2014 | Bedi | G06Q 30/0207 725/19 |
| 8,744,951 B2* | 6/2014 | Jobs | G06Q 30/02 705/37 |
| 8,949,882 B2* | 2/2015 | Sherwin | G11B 27/031 725/32 |
| 8,990,849 B2* | 3/2015 | Brueck | H04L 65/601 725/32 |
| 9,009,066 B2* | 4/2015 | Long | G06Q 30/02 705/14.68 |
| 9,226,042 B1* | 12/2015 | Kramer | H04N 21/812 |
| 2004/0226034 A1* | 11/2004 | Kaczowka | H04N 5/76 725/9 |
| 2007/0260508 A1* | 11/2007 | Barry | G06Q 30/02 705/14.12 |
| 2007/0288951 A1* | 12/2007 | Ray | G06Q 30/02 725/23 |
| 2008/0022302 A1 | 1/2008 | Tanaka et al. | |
| 2008/0040666 A1 | 2/2008 | Wang et al. | |
| 2008/0040741 A1* | 2/2008 | Matsumoto | H04N 5/76 725/32 |
| 2009/0013347 A1* | 1/2009 | Ahanger | G06Q 30/02 725/36 |
| 2009/0119169 A1* | 5/2009 | Chandratillake | G06F 17/30796 705/14.46 |
| 2009/0265214 A1 | 10/2009 | Jobs et al. | |
| 2010/0082833 A1 | 4/2010 | Masunaga et al. | |
| 2011/0191151 A1* | 8/2011 | Rosa | G06Q 30/02 705/14.1 |
| 2011/0231868 A1* | 9/2011 | Martens | G06Q 30/02 725/13 |
| 2012/0110616 A1* | 5/2012 | Kilar | H04N 7/17318 725/32 |
| 2012/0166289 A1* | 6/2012 | Gadoury | G06Q 30/0269 705/14.66 |
| 2012/0272278 A1* | 10/2012 | Bedi | G06Q 30/0207 725/105 |
| 2013/0211879 A1* | 8/2013 | Holland | G06Q 30/0241 705/7.32 |
| 2013/0211925 A1* | 8/2013 | Holland | G06Q 30/0241 705/14.72 |
| 2014/0033244 A1 | 1/2014 | Tanaka et al. | |
| 2014/0075469 A1* | 3/2014 | Zhao | H04N 21/4784 725/32 |
| 2014/0180814 A1* | 6/2014 | Rafenomanjato | G06Q 30/0255 705/14.53 |

FOREIGN PATENT DOCUMENTS

| | | |
|---|---|---|
| JP | 2007-221232 | 8/2007 |
| JP | 2008-017372 | 1/2008 |
| JP | 2008-040622 | 2/2008 |
| JP | 2008-042778 | 2/2008 |
| JP | 2009-288891 | 12/2009 |
| JP | 2010-087546 | 4/2010 |
| TW | 201229945 | 7/2012 |

OTHER PUBLICATIONS

Office Action from Japan Patent Office (JPO) in Japanese Patent Application No. 2012-288489, dated Jul. 27, 2015, along with a partial English language translation.

Office Action from Taiwan Patent Office in Taiwan Patent Application No. 102138637, dated Aug. 1, 2016, along with a partial English language translation.

Office Action from Japanese Patent Office in Japanese Patent Application No. 2015-218758, dated Sep. 30, 2016, along with a partial English language translation.

* cited by examiner

CONTENT PROVIDING SYSTEM, DEVICE, AND CONTROL METHOD FOR PROVIDING DIFFERENT INCREMENTS BASED ON SELECTED ADVERTISEMENT

BACKGROUND OF THE INVENTION

Field of the Invention

The present invention is related to a content providing system, a content providing device, a client device, a control method, and a storage medium, and in particular to a content service provided via a network.

Description of the Related Art

Client devices such as personal computers (PCs) that can connect to a network are widespread. Due to the pervasiveness of these kinds of devices, the network population on the Internet is increasing. In recent years, various services that use the Internet have been deployed, and entertainment services, such as games and the like, have been provided.

Amongst the services for network users, are so called online game services such as MMORPGs (Massively Multiplayer Online Role-Playing Games), for example. For example, a user, by launching a browsing application n a client device and connecting to a service providing server, can enjoy contents provided by such an online game service.

Amongst the online game services, there are services in which display of advertisements is made a condition of the provision of the content. The methods of displaying the advertisements can take many forms, but in every case is the condition that the advertisement be forcedly displayed simultaneously with the content. However, in simultaneously displaying an advertisement during the provision of content, it may bring about the following kind of bothersome situations for the user of the content. For example, there are cases in which the display of an advertisement causes the display area of the content to be narrower. Also, because processing resources for the display of the content are divided due to the update processing for displaying the advertisement, a delay, etcetera, in the display of the content could occur. In order to alleviate the drawbacks of this kind of displaying of advertisements, Japanese Patent Laid-open No. 2008-040622 discloses means of providing advertisements in which a user can select whether the timing of the display of a pop up advertisement is before, during or after the playback of the content.

However, in the case where, as in Japanese Patent Laid-open No. 2008-040622, the advertisement is played back before the content or particularly in the case where the advertisement is played back after the content, there is the possibility that the user will purposely not watch the display of the advertisement. In this case, the effect that advertisers wish to achieve with the advertisement cannot be achieved making the form of provision unappealing to advertisers.

Also, in the case where an advertisement is displayed during the playback of the main content, in order to prevent the above mentioned problems regarding simultaneous display, a form of displaying advertisements is conceivable in which the content is temporarily paused and the advertisement is displayed as has been done in television broadcasting. The timing of display of advertisements in television broadcasting is intentionally set to match the structure of the program by the producers of the content. However, with video distribution services that use the Internet, for example, an enormous number of videos are provided to users as content. Because it is not realistic for producers/service operators to set the advertisement display timing for such an enormous amount of content, normally the display timing of advertisements is set based on a specific criteria.

However, in the case where the advertisement display timing is automatically set in this way, the pausing of the playback of the main content in order to display advertisements has no relation to the substance of the content being displayed. For this reason, it is possible that the user's interest will be dampened. Meanwhile, in particular, in the case of interactive content such as online game services, because the progress of the content changes depending on the user, automatically setting the advertisement display timing is fraught with difficulty.

SUMMARY OF THE INVENTION

The present invention was made in view of such problems in the conventional technique. The present invention provides a content providing system, content providing device, a client device, a control method, and a storage medium for carrying out advertisement display in the context of content provision that is favorable for both advertisers and for users.

The present invention in its first aspect provides a content providing system in which a content providing device provides content that includes advertisement display to a client device, the client device comprising: a receiving unit which is able to receive data of content or data of an advertisement from the content providing device; a playback unit which is able to play back data of the content or data of the advertisement received from the receiving unit; and an instructing unit which is able to instruct playback of the advertisement during playback of data of the content by the playback unit, the content providing device comprising: an acquisition unit which is able to acquire data of the content and data of the advertisement; a determination unit which is able to determine an amount of time for which it is possible to play back data of the content in the client device; and a transmission unit which is able to transmit data acquired by the acquisition unit to the client device, wherein in a case where playback of the advertisement is instructed by the instructing unit: the playback unit pauses playback of data of the content and plays back data of the advertisement; the determination unit, after data of the advertisement has been played back, causes an amount of time for which it is possible to play back data of the content to increase by a predetermined amount of time predetermined for the advertisement; and the transmission unit, after transmitting data of the advertisement, transmits data of the content corresponding to the amount of time for which it is possible to play back data of the content determined by the determination unit.

The present invention in its second aspect provides a content providing device that provides content that includes advertisement display to a client device, the content providing device comprising: an acquisition unit which is able to acquire data of the content and data of the advertisement; a detection unit which is able to detect that an instruction was made for playback of data of the advertisement during playback of data of the content in the client device; a determination unit which is able to determine an amount of time for which it is possible to play back data of the content in the client device; and a transmission unit which is able to transmit data acquired by the acquisition unit to the client device, wherein in a case where it was detected by the detection unit that an instruction was made for playback of data of the advertisement during playback of data of the content: the determination unit causes an amount of time for which it is possible to play back data of the content to increase by a predetermined amount of time predetermined for the advertisement; and the transmission unit, after pausing transmission of data of the content and transmitting data of the advertisement, transmits data of the content corresponding to the amount of time for which it is possible to play back data of the content determined by the determination unit.

The present invention in its third aspect provides a client device that can use content that includes advertisement display comprising: an instructing unit which is able to instruct playback of the advertisement during usage of the content; a playback unit which is able to pause usage of the content and play back the advertisement in a case where playback of the advertisement was instructed by the instructing unit; and a control unit which is able to control so as to cause an amount of time that the content can be used to increase by a predetermined amount of time predetermined for the advertisement, and put the content into a usable state in which it can be used for the increased amount of usable time.

The present invention in its fourth aspect provides a control method for controlling a content providing device that provides content that includes advertisement display to a client device, the method comprising: an acquisition step in which acquisition unit acquires data of the content and data of the advertisement; a detection step in which detection unit detects that an instruction was made for playback of data of the advertisement during playback of data of the content in the client device; a determination step in which determination unit determines an amount of time for which it is possible to play back data of the content in the client device; and a transmission step in which transmission unit transmits data acquired in the acquisition step to the client device, wherein in a case where it was detected in the detection step that an instruction was made for playback of data of the advertisement during playback of data of the content: in the determination step, the detection unit causes an amount of time for which it is possible to play back data of the content to increase by a predetermined amount of time predetermined for the advertisement; and in the transmission step, the transmission unit, after pausing transmission of data of the content and data of the advertisement, transmits data of the content corresponding to the amount of time for which it is possible to play back data of the content determined in the determination step.

The present invention in its fifth aspect provides a control method for controlling a client device that can use content that includes advertisement display comprising: an instructing step in which an instructing unit instructs playback of the advertisement during usage of the content; a playback step in which a playback unit pause usage of the content and play back the advertisement in a case where playback of the advertisement was instructed in the instructing step; and a control step in which a control unit controls so as to cause an amount of time that the content can be used to increase by a predetermined amount of time predetermined for the advertisement, and puts the content into a usable state in which it can be used for the increased amount of usable time.

The present invention in its sixth aspect provides a content providing system that provides content that includes advertisement display to a client device, wherein within the context of a screen displayed by a displaying unit for the client device there is included: a content displaying part on which received content is displayed; an advertisement displaying part on which a received advertisement is displayed; an instruction part for receiving a instruction for causing the advertisement to be displayed on the advertisement displaying part when the content is being displayed on the content displaying part; and a time displaying part for displaying a displayable time for which the content can be displayed on the content display part, wherein after the advertisement is displayed on the advertisement displaying part according to an instruction made to the instruction part, the displayable time that is displayed on the time displaying part is longer than the displayable time displayed the time displaying part when the instruction was made, and while an advertisement is being displayed on the advertisement displaying part according to an instruction made to the instruction part, display of the content onto the content display part is paused.

Further features of the present invention will become apparent from the following description of exemplary embodiments (with reference to the attached drawings).

DESCRIPTION OF THE EMBODIMENTS

The First Embodiment

Figure 1:
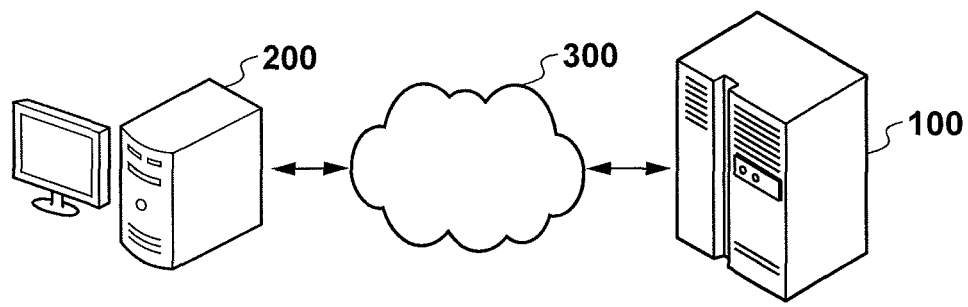
FIG. 1 is an view showing a system configuration of a game system according to a first embodiment of the present invention.

The details of exemplary embodiments of the present invention will be explained referring to the drawings. Note, the first embodiment explained below is an example for which the present invention is applied to a game system comprising a client device used by a user and a game server that provides game content via a network to the client device. However, the present invention can be applied to any client device for which it is possible to determine the usage of contents used on the client device on the condition of advertisement display. Note, the game server is an example of a content providing device of the present application, a service that provides the game content is an example of a content providing service of the present invention.

<Configuration of the Game System>

FIG. 1 is an view showing a system configuration of a game system according to a first embodiment of the present invention. As shown in the view, the game server 100 and the client device 200 are connected so that communication with each other via a network 300 is possible. Specifically, the game server 100 and the client device 200 are connected when on the client device 200 a browsing application (hereinafter referred to as a browser) is launched and access of the game server 100 is carried out.

In this embodiment, the client device 200, by connecting to the game server 100, can receive content pertaining to the game content service provided by the game server 100. The game content pertaining to the game content service may be such that it is possible to make the content usable by the user by performing corresponding processing on the client device 200 using necessary data received from the game server 100 with a function of the browser launched on the client device 200. Also, game content can be made usable to the user by the provision by streaming distribution of screens to be displayed on the browser, the browser having received the result of corresponding processing performed on the game server 100. In the following explanation, game content is made usable to the user when executed on the client device 200, but it is easy to envision the realization of a case where the execution takes place on the game server 100 being equally feasible by the adjusting the subjects of the various actions performed.

<Game Server 100 Configuration>

Figure 2:
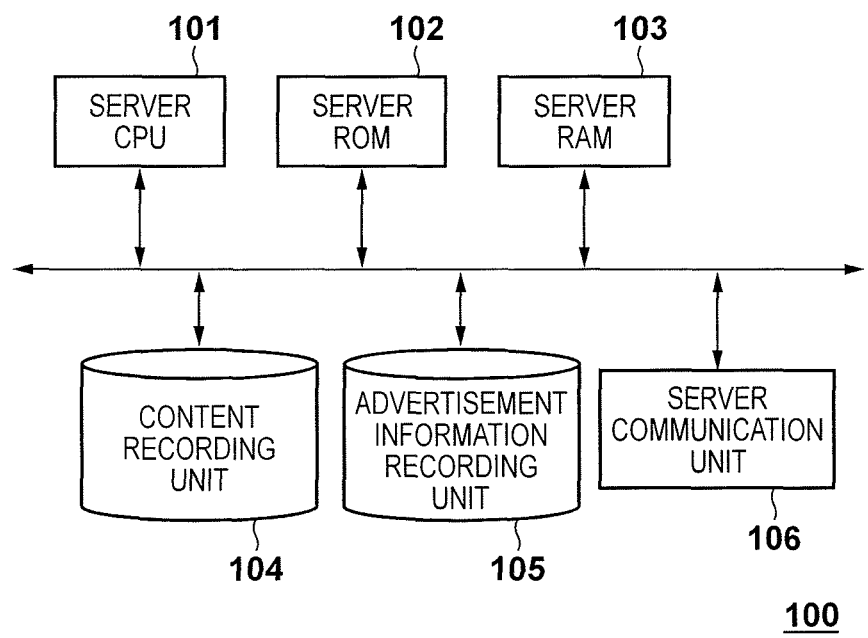
FIG. 2 is a block diagram showing a functional configuration of a game server 100 according to an embodiment of the present invention.

Here, the functional configuration of the game server 100 according to the present embodiment will be explained using the block diagram of FIG. 2.

A server CPU 101 controls the operation of each block in the game server 100. Specifically, the server CPU 101, by reading out the operation programs of each block stored in a server ROM 102, loading them into a server RAM 103 and executing them, controls the operation of each block.

The server ROM 102 is, for example, a re-writable, non-volatile memory, and on top of the operation programs of each block in the game server 100, it also stores parameters and the like necessary for the operation of each block. Furthermore, the server RAM 103 is a volatile memory, and it is not only a loading area for the operation programs of each block, it is also used as a storage area for intermediate data and the like output in the operation of the various blocks.

A content recording module 104 stores data (content data) pertaining to game content provided by the game server 100 according to the present embodiment. Content data includes various types of data such as a game program and graphics data necessary in the execution of processing corresponding to game content. In the present embodiment, content data stored in the content recording module 104 is sent via a server communication module 106 (explained later) to the client device 200 in a case where the client device 200, which is connected via a network 300, uses the service.

An advertisement information recording module 105 stores information related to advertisements (advertisement information) displayed during the execution of game content provided by the game server 100 of the present embodiment. Advertisement information can be, for example, image data, video data, etcetera of an advertisement, or it can be information that specifies advertising data maintained on an external server.

For the game content provided by the game server 100 of the present embodiment, the amount of time that the user can use the game content (usable time) is set based on advertisement display conditions. The usable time is initialized to be 0, and the user can increase it by selecting the advertisement to be shown at the start of service usage thereby causing the advertisement to be displayed. The amount that the usable time increases is set for each advertisement that can be selected, and the user can select an advertisement having learned the increase amount from a notification. Note, the increase amount can be set considering, for example, the relevance to the game content being used or current trends.

The usable time decreases along with game content execution time. In a case where the usable time reaches 0, the game content is paused, and the user, by once again displaying an advertisement, can increase the usable time, and restart the paused game content. Also, the user can intentionally pause the game content before the usable time reaches 0 and increase the usable time by displaying an advertisement. In other words, in the context of a game content providing service according to the present embodiment, the user can "charge" the usable time of content by displaying an advertisement, and anticipating the development of the game, can secure usable time in a calculated fashion.

In the following way, problems can be alleviated. For example, the user can secure usage time beforehand when faced with a game scene which is a critical junction in the progress of the story within the development of the game, such as a so called "boss" character that is difficult to defeat and that takes time to defeat. In this way, a situation where the user loses interest because the usable time runs out in the middle of such a game scene can be avoided. Also, a situation that is bad for the user, such as when the service is forcibly paused in the middle of a scene in which a difficult input operation is required and as a result the user fails to successfully perform the input operation upon restart can be avoided.

The server communication module 106 is a communication interface of the game server 100. The server communication module 106 can send data to and receive data from the client device 200 via the network 300 according to a predetermined protocol.

<Client Device 200 Configuration>

Figure 3:
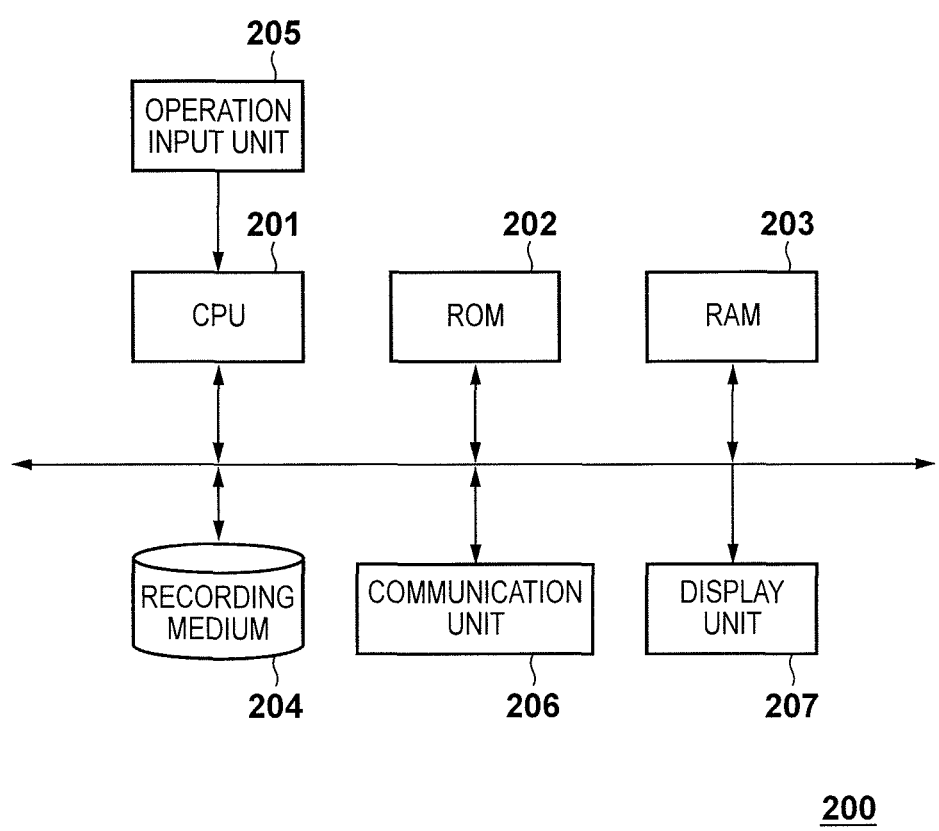
FIG. 3 is a block diagram showing a functional configuration of the client device 200 according to an embodiment of the present invention.

Next, the functional configuration of the client device 200 according to the present embodiment will be explained using the block diagram of FIG. 3.

A CPU 201 controls the operation of each of the blocks of the client device 200. Specifically, the CPU 201, by reading out the operation programs of each block stored in a ROM 202 or a recording medium 204, loading them into a RAM 203 and executing them, controls the operation of each block.

The ROM 202 is, for example, a re-writable, non-volatile memory, and stores the operation programs of each block in the client device 200 and parameters and the like necessary for the operation of the various blocks. Furthermore, the RAM 203 is a volatile memory, and it is not only a loading area for the operation programs of each block, it is also used as a storage area for intermediate data and the like output in the operation of the various blocks. In a case where processing of game content provided by the game server 100 is executed on the client device 200 of the present embodiment, necessary content data is stored in the RAM 203 after being received via a communication module 206 (described later)

The recording medium 204 is a recording apparatus removably mounted on the client device 200 such as an HDD. In the present embodiment, at least a program pertaining to the browser is stored on the recording medium 204. In a case where the user wishes to use a game content service provided by the game server 100, the user launches a browser and connects to the game server 100.

An operation input module 205 is a user interface of the client device 200 such as a game pad, a mouse or a keyboard. The operation input module 205 analyzes user operation input done on a corresponding device and transmits control signals corresponding to the operation input to the CPU 201.

The communication module 206 is a communication interface of the client device 200. The communication module 206 can send data to and receive data from the game server 100 via the network 300 according to a predetermined protocol.

A display module 207 is a display apparatus connected to the client device 200. Screen data generated by a GPU (not shown) is displayed on the display module 207. In the present embodiment, screen data pertaining to game content executed in a browser is displayed in the display module 207.

<Content Usage Processing>

Figure 4:
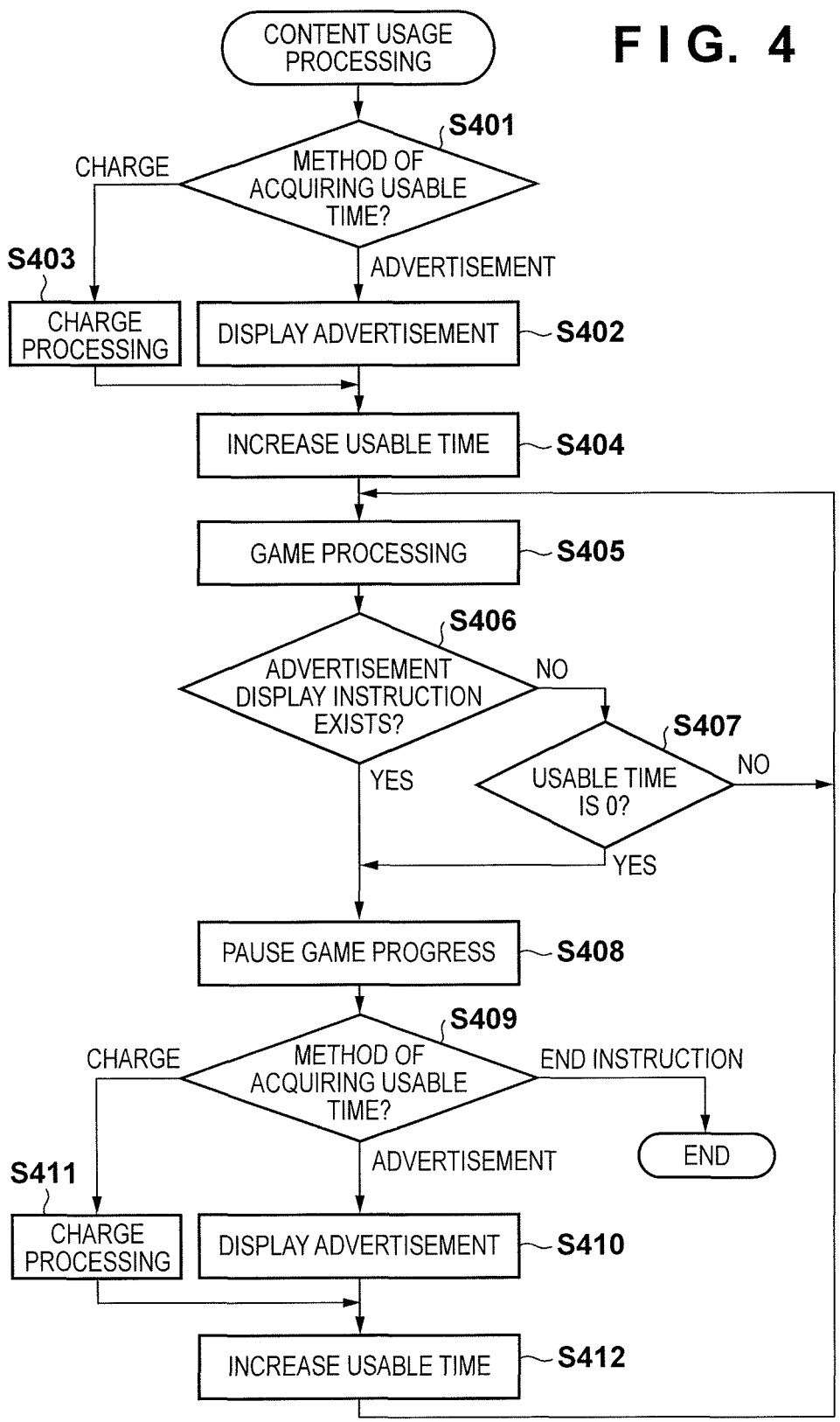
FIG. 4 is a flow chart exemplifying content usage processing performed in the client device 200 according to the first embodiment of the present invention.

The specifics of content usage processing of the client device 200 of the present embodiment having this kind of configuration will be explained using the flowchart of FIG. 4. The processing corresponding to this flowchart can be realized by the CPU 201, for example, reading out a browser executable game program pertaining to game content provided by the game server 100, loading it into the RAM 203 and executing it using a function of the browser. Note, the explanation of this content usage processing is assumes that it is started when, for example, a browser launched on the client device 200 connects to the game server 100 and the game contents to be used are selected.

In step S401, the CPU 201 receives the selection of the method of acquisition of usable time of the provided game content. Usable time of game content provided by the game server 100 of the present embodiment can be acquired through display of advertisements or through a charge. Note, the following explanation assumes that the user can acquire the same amount of usable time with a charge as in the case where the user carried out the display of one advertisement. However, usage of content based on a charge is not limited to this, and unlimited usage up until a particular point in the content can also be allowed. In a case where the CPU 201 determines that the usable time acquisition method selected by the user is advertisement display it moves the processing on to step S402, and in a case where the CPU 201 determines the acquisition method to be a charge, it moves the processing on to step S403.

In step S402, the CPU 201 carries out playback of the advertisement and makes the display module 207 display the advertisement. Information or data for the advertisement to be played back is, for example, read out of the advertisement information recording module 105 by the server CPU 101, and sent via the server communication module 106 to the client device 200 as advertisement information. The CPU 201 reads out data corresponding to the advertisement information obtained by the communication module 206, plays it, thereby carrying out display of the advertisement.

Figure 5A:
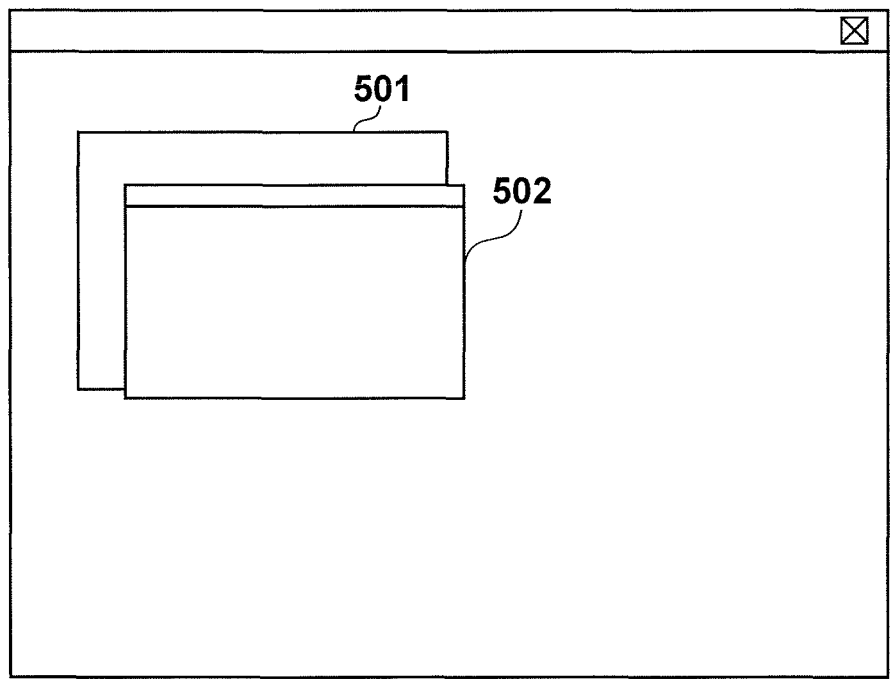
FIGS. 5A and 5B are examples of a screen shown during content usage on the client device 200 according to the first embodiment of the present invention.

Advertisement display, as shown, for example, in FIG. 5A, is carried out in the display module 207, with a window 502 for displaying the advertisement superposed on an area 501 for displaying screens of the game pertaining to the game content. However, the embodiments of this invention are not limited to this and the same window or area can be used for game screens and advertisements.

Also, in the present embodiment, explanation is given in which the advertisement that is played back is of a single type or the advertisement is automatically selected, but one in which the user can select the advertisement to be played in also possible. In this case, the CPU 201, for example, causes a list of selectable advertisements to be displayed by the display module 207. The CPU 201 can then carry out playback of an advertisement when it receives the selection instruction from the user to carry out playback of the advertisement. Note, in this case, the content usable time acquirable by playback can differ for each of the selectable advertisements. For example, the acquirable usable time for related game content advertisements, game information site advertisements and the like can be made shorter (for example 10 minutes), and the acquirable usable time for advertisements unrelated to the game content, advertisements related to game content that the service provider wants to promote, and the like can be set to be longer (for example 25 minutes).

Next, the CPU 201, after completing the playback of the advertisement, moves the processing on to step S404.

In the case where acquisition of usable time by charge is selected in step S401, the CPU 201 carries out normal charge processing of step S403 and moves the processing on to step S404 without displaying an advertisement.

In step S404, the CPU 201, increases the usable time by updating corresponding information stored in, for example, the RAM 203. The usable time is 0 when content usage begins, and the CPU 201, in step S402, increases the value of the usable time by a predetermined amount for advertisement playback, or by an amount corresponding to a charge. Note, usable time information can be made clear to the user during usage of the game content as shown in 503 of FIG. 5B. Usable time decreases along with usage of the provided game content.

In step S405, the CPU 201 performs normal game processing pertaining to game content, and carries out display of a screen pertaining to game content.

Figure 5B:
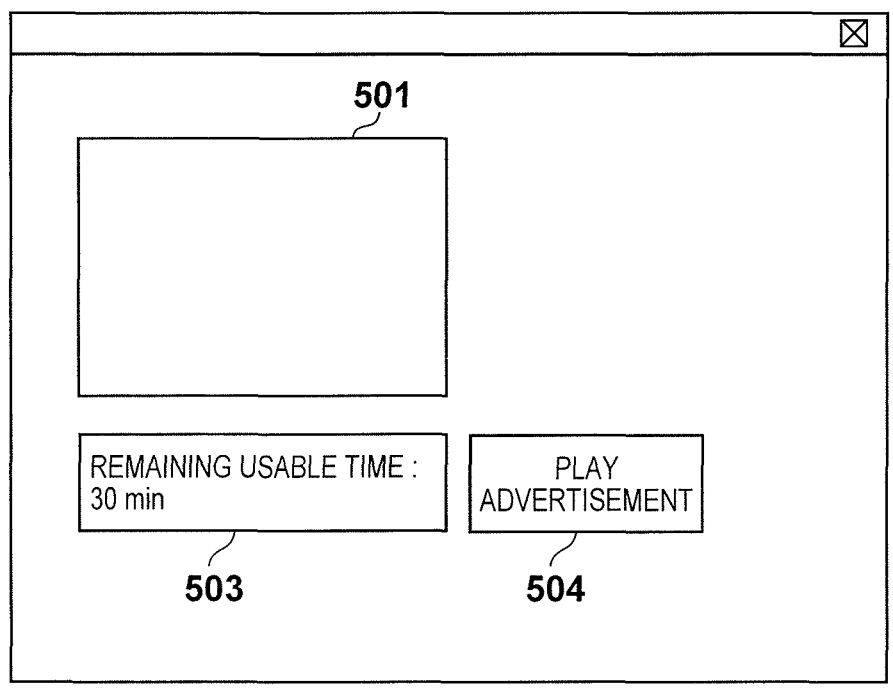

In step S406, the CPU 201, determines if an instruction to display an advertisement was made. As described above, in the present embodiment, even if the usable time has not reached 0, an advertisement can be displayed intentionally at arbitrary timing, thereby increasing the usable time. Advertisement display instructions during the usage of content can be made with operation input into an advertisement display instruction area 504 as shown in FIG. 5B for example. The CPU 201, determines whether a control signal indicating that operation input was made into this area was received from the operation input module 205. In a case where the CPU 201 determines that an instruction to display an advertisement was made, it moves the processing on to step S408, and in a case where the CPU 201 determines that such an instruction was not made, it moves the processing on to step S407.

In step S407, the CPU 201, determines whether the usable time has reached 0, in other words whether continuous execution time of game processing has reached the usage time increase amount of the increase in step S405. In a case where the CPU 201 determines that the usable time has reached 0, it moves the processing on to step S408, and in a case where the CPU 201 determines that 0 has not been reached, it moves the processing on to step S405.

In step S408, the CPU 201 pauses the progress of the game for which game processing was started in step S405. Here, the game screen can be maintained in the state in which the game screen is paused, and it is also possible to control so that the paused game screen is not displayed until the usable time is increased.

In step S409, the CPU 201 receives a selection of the method of usage time acquisition for provided game content in the same way as in step S401.

In a case where the CPU 201 determines that the method of usage time acquisition is advertisement display, after completion of advertisement playback in step S410, and usage time increase processing in step S412, the processing returns to step S405 and the paused game processing restarts. Also, the CPU 201, in a case where it determines that the method of usage time acquisition is a charge, after completion of the charge processing of step S411 and the usage time increase processing of usage time increase processing in step S412, the processing returns to step S405 and the paused game processing restarts. Note, in a case such as when the game progress was paused in a state in which the user was in the middle of an input operation, where an undesirable situation could occur due to a user being unable to make an operation after the restarting of the game, the game can be restarted with progress returned to a point where the input operation can be made.

Note, in the game content service of the present embodiment, advertisement display can be carried out according to the volition of the user. For this reason, in a case where in step S407 usage time reached 0, the processing gets to step S409, and there is an instruction to end without any request to increase usable time from the user, the CPU 201 can complete the processing for the usage of the content.

In this way, it is possible to increase the usable time of content by advertisement display or charge at timing desirable to the user of the content from content usage processing of the present embodiment. In other words, to the user, it is possible to reduce the occurrence of situations in which game usage is interrupted at uncontrolled timing because it is possible to adjust the remaining amount of usable time in accordance with the progress of the game. Also, to the advertiser, the opportunity of advertisement display in order to use a game is secured, and advertisements can be provided at timing desirable for the user, who will therefore more likely be in a calm state of mind.

Note, in the present embodiment, in the explanation given content is provided via a network. However, the embodiments of the present invention are not limited to this. For example, the present invention could be provided for content provided on a recording medium such as a DVD-ROM or a CD-ROM for which the display of advertisements is made necessary for usage of the content on a PC or a dedicated device. In this case, the advertisements to be shown can be included on the recording medium or can be provided via a network.

As explained above, the client device of the present embodiment, having the ability to use content in conjunction with display of advertisements, can carry out the advertisement display in the context of content provision that is favorable for both advertisers and for users. Specifically the client device, in a case where the playback of an advertisement is instructed during content usage, pauses the usage of the content and plays back the advertisement. Then, after the playback of the advertisement has completed, the client device controls so as to increase the amount of time that the content can be used by an amount predetermined for the advertisement, and put the content into a state in which it can be used for the increase usable time amount.

The Second Embodiment

In the first embodiment explained above, an example in which processing pertaining to game content is performed on the client device and the management of usable time is also carried out on the client device. However the embodiments of the present invention are not limited to this. The device that manages the usable time is not limited to the client device; for example, the server that provides the content to the client device can do the management. Below, an example in usable time is kept track of, and video data is delivered to the client device by streaming of the appropriate usable time amount is explained.

Figure 6:
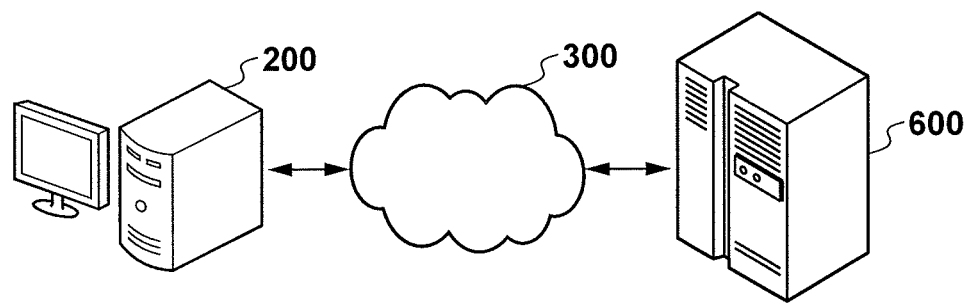
FIG. 6 is a view showing a system configuration of a content providing system according to the second embodiment of the present invention.

Note, in the present embodiment, an example of a case where video data content is transmitted between a video server 600 having the same configuration as the game server 100 in the first embodiment and the client device 200. As show in FIG. 6, the video server 600 and the client device 200 are connected via the network 300, and a user uses a video distribution service provided by the video server 600 by executing a browser on the client device 200 and connecting to the video server 600. In other words, in the present embodiment, the CPU 201 does not perform the game processing or the above described content usage processing, and only carries out processing that is standard in a video distribution service such as receiving data from the video server 600, and decoding and playing video.

<Content Provision Processing>

Figure 7:
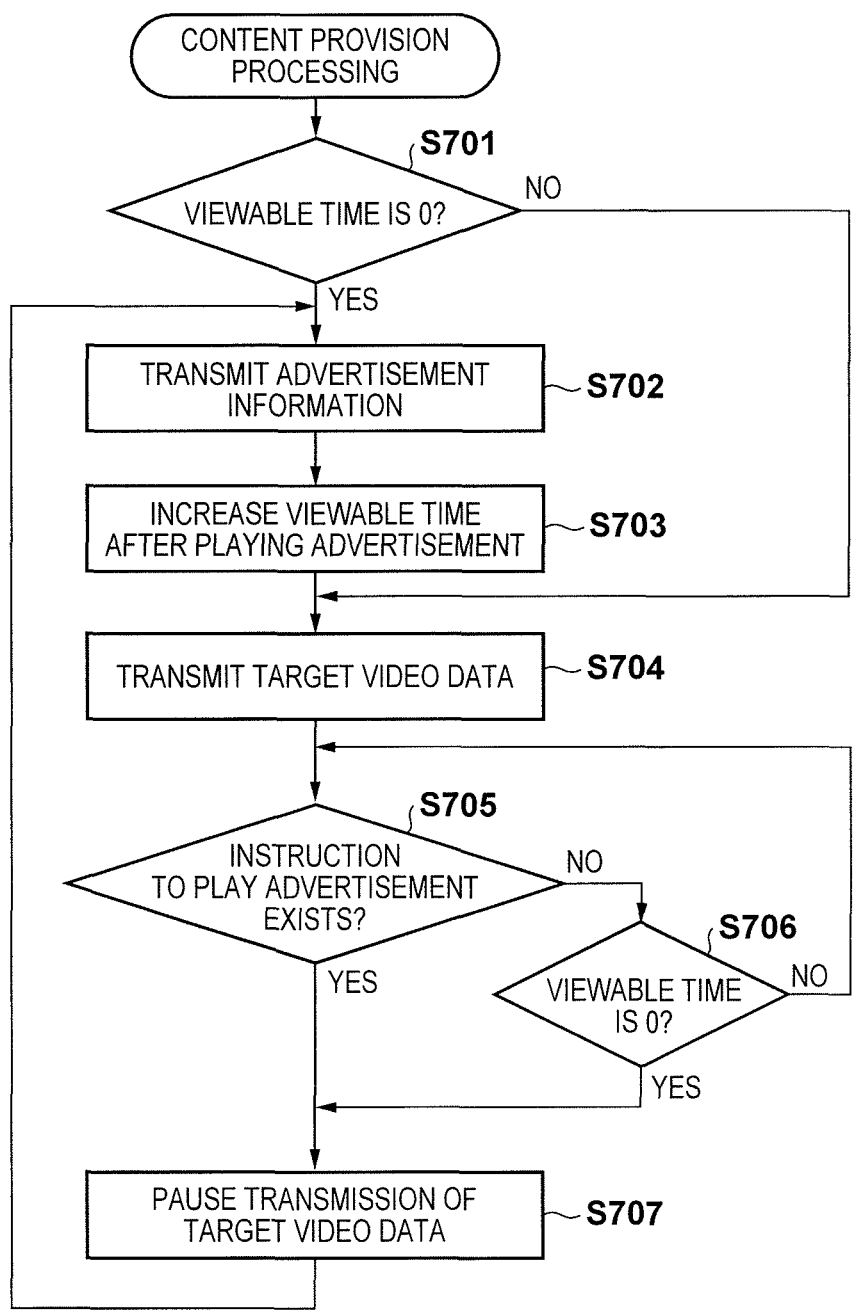
FIG. 7 is a flow chart exemplifying content providing processing performed in the client device 200 according to the second embodiment of the present invention.

Below, the specifics of content provision processing carried out on the video server 600 according to the present embodiment are explained using the flowchart of FIG. 7. Processing corresponding to this flowchart is realized by the server CPU 101, for example, reading out a corresponding program from the server ROM 102, loading it into the server RAM 103 and executing it. Note, the explanation assumes that this content provision processing starts when, for example, on a browser launched on the client device 200, the client device 200 an the video server 600 are connected, and the distribution request for video content to be played (target video) selected on the client device 200 is received by the server communication module 106.

In step S701, the server CPU 101 determines whether the viewable time of the target video is 0. In the present embodiment, information for the viewable time is, for example, stored in the server RAM 103, and the CPU 201 refers to this data when making the determination of this step. In a case where the server CPU 101 determines that the viewable time for the target video is 0, it moves the processing on to step S702, and in a case where the server CPU 101 determines that the viewable time for the target video is not 0, it moves the processing on to step S704. Note, the viewable time can be set for viewing of a single target video, or it can, for example, be set for viewing of multiple videos provided by the video server 600.

In step S702, the server CPU 101 transmits the advertisement information read out from the advertisement information recording module 105 to the client device 200 via the server communication module 106 so that the advertisement can be displayed on the client device 200. Note, in the present embodiment, the explanation assumes that viewable time can only be acquired by playing advertisements, but also allowing acquisition of viewable time through a charge as described in the first embodiment is also possible. Also, making it possible for the advertisement to be played back to be selectable out of multiple advertisements on the client device 200 is also possible. In this case, information on the advertisement that was selected to be played is transmitted from the client device 200 to the video server 600.

In step S703, when the server CPU 101 determines that playback of the advertisement on the client device 200 has completed through, for example, a notification from the client device 200, it increases the viewable time by an amount predetermined for the display of the advertisement.

In step S704, the server CPU 101 reads out target video data from the content recording module 104, transmits the data to the server communication module 106, which transmits the data to the client device 200.

In step S705, the server CPU 101 determines whether an instruction was made on the client device 200 to interrupt the playback of the target video to play back an advertisement in order to increase viewable time. Specifically, the server CPU 101 carries out the determination of this step based on whether information indicating that an instruction came from the client device 200. In a case where the server CPU 101 determines that the instruction to interrupt the playback of the target video to play back an advertisement was made, it moves the processing on to step S707, and in the case where it determines that such an instruction was not made, it moves the processing on to step S706.

In step S706, the server CPU 101, determines whether the viewable time of the target video has reached 0. In a case where the server CPU 101 determines that the viewable time of the target video has reached 0, it moves the processing on to step S707 and in the case where the server CPU 101 determines that the viewable time has not reached 0 it returns the processing to step S705.

In step S707, the server CPU 101 pauses the data transmission of the target video and returns the processing to step S702. Note, in this case, when the processing once again gets to step S704, the server CPU 101 transmits data continuing from the data of the target video that was paused. Specifically, after the playback of the advertisement, the next data frame continuing from the target video data that was paused is transmitted to the client device 200 and played.

In this way, the video server 600 of the present embodiment increases the usable time for viewing of a target video in the client device 200 by an amount corresponding to display of an advertisement. Also, the display of the advertisement is performed at arbitrary timing during the playback of the target video. Because the video server 600 can pause transmission of the target video and cause an advertisement to be displayed on the client device 200, the results of the advertising desired by the advertiser can be maintained, and a service in which viewable time can be controlled by the user can be provided.

Note, in step S704, the server CPU 101 can, for example, control so as to transmit only the video data corresponding to the remaining viewable time to the client device 200. By doing this, because data exceeding the viewable time is not transmitted to the client device 200, the issue of unauthorized viewing, etcetera, is not a problem.

Also, the data can be transmitted as video compressed in an encoding format such as, for example, H.264. In this case, the frame upon which the playback in the client device 200 is paused can be the frame before an intra frame (frames that are decodable without reference to previous frames) such as the first frame in an encoding unit. Otherwise, the frame upon which transmission is restarted after a pausing can be the next intra frame subsequent to the pause position or the previous intra frame. By doing this, even in a case where the information referred to in decoding is not maintained during the pausing, the frame of the target video displayed after restarting can be provided at an appropriate quality.

As explained above, the content providing system of the present embodiment allows the carrying out advertisement display in the context of content provision that is favorable for both advertisers and for users. Specifically, in the content providing system, in a case where the display of an advertisement is instructed during the playback of content data, the client device pauses the playback of content data and plays back the advertisement. After the advertisement is played, the content providing device increases the amount of time for which it is possible to play back the content data by an amount predetermined for the advertisement. Furthermore, the content providing device, after transmitting the advertisement data, transmits content data corresponding to the amount of time for which content data can be played.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-288489, filed Dec. 28, 2012, which is hereby incorporated by reference herein in its entirety.

What is claimed is:

1. A content providing device that provides content including an advertisement display to a client device, the content providing device comprising:
    a receiver that acquires data of the content and data of an advertisement;
    a detector that detects that an instruction was made for playback of the data of the advertisement, which is selected from a plurality of selectable advertisements on the client device, during playback of the data of the content in the client device;
    a processor that determines an amount of time for which it is possible to play back the data of the content in the client device; and
    a transmitter that transmits data acquired by the receiver to the client device,
    wherein when the detector detects that the instruction was made for the playback of the data of the selected advertisement during the playback of the data of the content:
        the processor increases the amount of time for which it is possible to play back the data of the content by a predetermined amount of time for the selected advertisement; and
        the transmitter, after pausing transmission of the data of the content and transmitting data of the selected advertisement, transmits the data of the content corresponding to the amount of time for which it is possible to play back the data of the content determined by the processor, and
    wherein the processor determines that the predetermined amount of time differs for each of the plurality of selectable advertisements, and the processor determines that the predetermined amount of time is longer for an advertisement having lower relevance to the content than for an advertisement having higher relevance to the content.

2. The content providing device according to claim 1, wherein when the detector detects that the instruction was made for the playback of the data of the selected advertisement in the client device:
    the transmitter, after playback of the data of the selected advertisement that the transmitter sent completes, transmits the data of the content so that the data of the content can be played back.

3. The content providing device according claim 1, further comprising:
    a charger that receives a charge for increasing the amount of time for which it is possible to play back the data of the content,
    wherein the processor, when the charge is received by the charger, increases the amount of time for which it is possible to play back the data of the content.

4. The content providing device according claim 1, further comprising:
   a charger that receives a charge for increasing the amount of time for which it is possible to play back the data of the content,
   wherein the processor, when the charge is received by the charger, sets the amount of time for which it is possible to play back data of the content to be unlimited.

5. A control method for controlling a content providing device that provides content including an advertisement display to a client device, the method comprising:
   acquiring, by a receiver, data of the content and data of an advertisement;
   detecting, by a detector, that an instruction was made for playback of the data of the advertisement, which was selected out of a plurality of selectable advertisements on the client device, during playback of the data of the content in the client device;
   determining, by a processor, an amount of time for which it is possible to play back the data of the content in the client device; and
   transmitting, by a transmitter, the acquired data to the client device,
   wherein when it was detected by the detector that the instruction was made for the playback of the data of the selected advertisement during the playback of the data of the content:
      increasing, by the processor, the amount of time for which it is possible to play back the data of the content by a predetermined amount of time for the selected advertisement; and
      after pausing transmission of the data of the content and transmitting data of the selected advertisement, transmitting, by the transmitter, the data of the content corresponding to the amount of time, for which it is possible to play back data of the content, and
   wherein the predetermined amount of time is determined, by the processor, to be different for each of the plurality of selectable advertisements, and the predetermined amount of time is determined, by the processor, to be longer for an advertisement having lower relevance to the content than for an advertisement having higher relevance to the content.

6. A non-transitory computer-readable storage medium storing a program for causing a computer to perform processes of the content providing device of claim 1.

7. The content providing device according to claim 1, wherein the content is a video game.

8. The content providing device according to claim 1, wherein the content is a web-based game.

9. The content providing device according to claim 1, wherein the increased amount of time is used to play back the content that was received along with the selected advertisement.

10. The content providing device according to claim 1, wherein the advertisement is selectable to be played to increase an amount of time for which it is possible to play back the data of the content before existing time for which it is possible to play back the data of the content is depleted.

* * * * *